US012342421B2

(12) United States Patent
Choi

(10) Patent No.: US 12,342,421 B2
(45) Date of Patent: Jun. 24, 2025

(54) LOW-POWER RCS COMMUNICATION DEVICE AND METHOD THEREOF

(71) Applicant: SAMSUNG ELECTRONICS CO., LTD., Suwon-si (KR)

(72) Inventor: Minkwan Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 450 days.

(21) Appl. No.: 17/959,673

(22) Filed: Oct. 4, 2022

(65) Prior Publication Data

US 2023/0028974 A1 Jan. 26, 2023

Related U.S. Application Data

(63) Continuation of application No. PCT/KR2021/003102, filed on Mar. 12, 2021.

(30) Foreign Application Priority Data

Apr. 14, 2020 (KR) .................... 10-2020-0045467

(51) Int. Cl.
*H04W 8/18* (2009.01)
*H04W 48/18* (2009.01)
*H04W 88/06* (2009.01)

(52) U.S. Cl.
CPC ........... *H04W 8/183* (2013.01); *H04W 48/18* (2013.01); *H04W 88/06* (2013.01)

(58) Field of Classification Search
CPC ..... H04W 8/183; H04W 48/18; H04W 88/06; H04W 8/24; Y02D 30/70
(Continued)

(56) References Cited

U.S. PATENT DOCUMENTS 8,078,180 B2 12/2011 Torres et al.
8,527,006 B2 * 9/2013 Tat ........................ H04W 8/183
455/552.1

(Continued)

FOREIGN PATENT DOCUMENTS

CN 101427542 A 5/2009
CN 106465134 A 2/2017
(Continued)

OTHER PUBLICATIONS

V1 Gsm Association: "GSM Association Non Confidential Official Document RCS 5.1: Services and Client Specification Rich Communication Suite 5.1 Advanced Communications Services and Client Specification Security Classification", pp. 1-100, XP055122342.
(Continued)

*Primary Examiner* — Huy C Ho
(74) *Attorney, Agent, or Firm* — Nixon & Vanderhye P.C.

(57) ABSTRACT

An electronic device may include a wireless communication circuit, a processor operatively connected to the wireless communication circuit, multiple SIMs, and a memory operatively connected to the processor. The memory may store instructions which, when executed, may cause the processor to: acquire first subscriber identification information and second subscriber identification information from the multiple SIMs; generate a matching map in which RCS functions supported b the first subscriber identification information and the second subscriber identification information are compared; search for whether the first subscriber identification information and the second subscriber identification information are matched to each other, by using the matching map; when the first subscriber identification information and the second subscriber identification information are not matched to each other, perform capability exchange with an external electronic device for the first subscriber identification information by using the wireless communication cir- (Continued)

cuit; when the first subscriber identification information and the second subscriber identification information are matched to each other, search for whether a result of capability exchange for the second subscriber identification information is stored in the second subscriber identification information; and determine whether to activate or deactivate an RCS function which can be supported by the first subscriber identification information on the basis of the result of the capability exchange for the second subscriber identification information.

20 Claims, 10 Drawing Sheets

(58) Field of Classification Search
USPC .......................................................... 455/558
See application file for complete search history.

(56) References Cited

U.S. PATENT DOCUMENTS

| | | | |
|---|---|---|---|
| 9,559,933 | B2 | 1/2017 | Jang |
| 9,578,683 | B2 | 2/2017 | Wu et al. |
| 9,948,732 | B2 | 4/2018 | Choi et al. |
| 10,187,245 | B2 | 4/2019 | Park et al. |
| 11,272,352 | B2 | 3/2022 | Choi |
| 2013/0225239 | A1 | 8/2013 | Wu et al. |
| 2013/0310035 | A1* | 11/2013 | Gouriou .............. H04W 60/005 455/435.1 |
| 2014/0372557 | A1 | 12/2014 | Buckley et al. |
| 2015/0327207 | A1 | 11/2015 | Bharadwaj |
| 2017/0171902 | A1 | 6/2017 | Tillman et al. |
| 2018/0206111 | A1 | 7/2018 | Heath et al. |
| 2018/0359284 | A1* | 12/2018 | Kotreka .............. H04L 65/1083 |
| 2020/0037281 | A1 | 1/2020 | Lee et al. |
| 2022/0159451 | A1 | 5/2022 | Choi |

FOREIGN PATENT DOCUMENTS

| | | |
|---|---|---|
| EP | 2 677 775 A1 | 12/2013 |
| KR | 10-2013-0123732 | 11/2013 |
| KR | 10-2015-0084284 | 7/2015 |
| KR | 10-2019-0100585 | 8/2019 |
| KR | 10-2019-0117937 | 10/2019 |

OTHER PUBLICATIONS

Extended Search Report Jul. 14, 2023 for EP Application No. 21787686.1.
Chinese Office Action dated Mar. 29, 2024 for CN Application No. 202180028846.4.
SA WG2 Meeting #118bis; S2-170181; Jan. 16-20, 2017; 23.501: Proposal for 5G System Identities; Qualcomm Incorporated.
GSM Association, Official Document RCC.07—Rich Communication Suite—Advanced Communications Services and Client Specification, v11.0, 389 pages.
International Search Report for PCT/KR2021/003102, mailed Jul. 1, 2021, 4 pages.
India Office Action dated Jan. 1, 2024 for IN Application No. 202217055265.

* cited by examiner

| RCS-e service | Tag |
|---|---|
| IM/Chat | +g.3gpp.iari-ref="urn%3Aurn-7%3agpp-application.ims.iari.rcse.im" |
| File transfer | +g.3gpp.iari-ref="urn%3Aurn-7%3agpp-application.ims.iari.rcse.ft" |
| Image share | +g.3gpp.iari-ref="urn%3Aurn-7%3agpp-application.ims.iari.gsma-is" |
| Video share | +g.3gpp.cs-voice |

FIG. 2B

| SIM NO. | 1 | 2 | 3 |
|---|---|---|---|
| 1 | - | -1 | -1 |
| 2 | -1 | - | -1 |
| 3 | -1 | -1 | - |

600

| SIM NO. | 1 | 2 | 3 |
|---|---|---|---|
| 1 | - | 0 | 1 |
| 2 | 0 | - | 0 |
| 3 | 1 | 0 | - |

610

| SIM NO. | 1 | 2 | 3 |
|---|---|---|---|
| 1 | - | 0 | -1 |
| 2 | 0 | - | -1 |
| 3 | -1 | -1 | - |

LOW-POWER RCS COMMUNICATION DEVICE AND METHOD THEREOF

CROSS-REFERENCE TO RELATED APPLICATIONS

This application is a continuation of International Application No. PCT/KR2021/003102, filed Mar. 12, 2021, designating the United States, in the Korean Intellectual Property Receiving Office, and claiming priority to KR Patent Application No. 10-2020-0045467, filed Apr. 14, 2020, the disclosures of which are all hereby incorporated by reference herein in their entireties.

BACKGROUND

Field

Example embodiments may relate to a low-power RCS communication device, and for example, to a method of reducing current consumption of an electronic device when communicating in an RCS method in a multi-SIM environment.

Description of Related Art

A rich communication suite (RCS) provides various communication functions to users of electronic devices through a communication network based on a standard specification proposed by the global system for mobile communications association (GSMA).

The RCS provides various communication functions such as call function (e.g., an enriched call) to share multimedia files such as videos or photos during a call, contact list function (e.g., an enhanced phonebook) that can acquire information about the communication partner registered in a contact list in real time, and messaging function (e.g., an enriched messaging) to share files while chatting.

As described above, to use an RCS service that provides various communication functions, it is typical to perform a procedure of determining whether the electronic device of the communication counterpart side to perform communication supports the RCS service. For example, the user's electronic device performs a procedure of determining whether the RCS service is supported for each contact stored in the contact list, and this verification procedure is referred to as a capability exchange. The capability exchange is collectively performed for all contacts stored in the contact list of the electronic device.

An electronic device using a multi-SIM may support RCS communication as described above. In this case, the capability exchange may be performed for all contacts stored in each multi-SIM.

SUMMARY

In the case of the capability exchange currently performed in the RCS service, since the capability exchange is collectively performed for all contacts registered in the contact list, it takes a lot of time until the capability exchange for all contacts is completed. Furthermore, in an environment in which the electronic device uses a multi-SIM, since the capability exchange should be performed for each multi-SIM, more time is required. As a result, as a battery power of the electronic device performing the capability exchange is rapidly consumed, there is a problem in that the use time of the electronic device is reduced.

Accordingly, according to various example embodiments, there may be provided a method of performing the capability exchange with low-power in order for an electronic device to use an RCS function in a multi-SIM environment.

According to an example embodiment, an electronic device may include a wireless communication circuit, a processor operatively connected, directly or indirectly, with the wireless communication circuit, a multi-SIM, and a memory operatively connected, directly or indirectly, with the processor, and the memory may store instructions that, when executed, may be configured to cause the processor to obtain first subscriber identification information and second subscriber identification information from the multi-SIM, to generate a matching map in which RCS functions supported by the first subscriber identification information and the second subscriber identification information are compared, to search for whether the first subscriber identification information matches the second subscriber identification information using the matching map, to perform a capability exchange for the first subscriber identification information with an external electronic device using the wireless communication circuit when the first subscriber identification information does not match the second subscriber identification information, to search for whether a result of performing the capability exchange for the second subscriber identification information is stored in the second subscriber identification information when the first subscriber identification information matches the second subscriber identification information, and to determine activation or deactivation of the RCS functions supported by the first subscriber identification information based on the result of performing the capability exchange for the second subscriber identification information.

According to an example embodiment, a method of operating an electronic device may include obtaining first subscriber identification information and second subscriber identification information from a multi-SIM, generating a matching map in which RCS functions supported by the first subscriber identification information and the second subscriber identification information are compared, searching for whether the first subscriber identification information matches the second subscriber identification information using the matching map, performing a capability exchange for the first subscriber identification information with an external electronic device when the first subscriber identification information does not match the second subscriber identification information, searching for whether a result of performing the capability exchange for the second subscriber identification information is stored in the second subscriber identification information when the first subscriber identification information matches the second subscriber identification information, and determining activation or deactivation of the RCS functions supported by the first subscriber identification information based on the result of performing the capability exchange for the second subscriber identification information.

According to an example embodiment, in a computer-readable recording medium storing one or more instructions executable by at least one processor, the one or more instructions may include instructions for obtaining first subscriber identification information and second subscriber identification information from a multi-SIM, generating a matching map in which RCS functions supported by the first subscriber identification information and the second subscriber identification information are compared, searching for whether the first subscriber identification information matches the second subscriber identification information using the matching map, performing a capability exchange for the first subscriber identification information with an external electronic device when the first subscriber identification information does not match the second subscriber identification information, searching for whether a result of performing the capability exchange for the second subscriber identification information is stored in the second subscriber identification information when the first subscriber identification information matches the second subscriber identification information, and determining activation or deactivation of the RCS functions supported by the first subscriber identification information based on the result of performing the capability exchange for the second subscriber identification information.

According to various example embodiments, power consumption due to capability exchange of the electronic device may be reduced by performing a capability exchange with low-power by an electronic device equipped with a multi-SIM.

In addition, various effects directly or indirectly identified through the disclosure may be provided.

BRIEF DESCRIPTION OF DRAWINGS

The above and other aspects, features, and advantages of certain example embodiments will be more apparent from the following detailed description, taken in conjunction with the accompanying drawings, in which:

FIG. 2B is a diagram illustrating an example of tag information exchanged in an operation of performing a capability exchange of an electronic device.

FIG. 6 illustrates a method of setting a matching map for a capability exchange of an electronic device, according to an example embodiment.

In connection with the description of the drawings, the same or similar reference numerals may be used for the same or similar components.

DETAILED DESCRIPTION

Hereinafter, various example embodiments are described with reference to the accompanying drawings. However, it should be understood that they are not intended to limit the scope to specific embodiments, and include various modifications, equivalents, and/or alternatives of the example embodiments.

Figure 1:
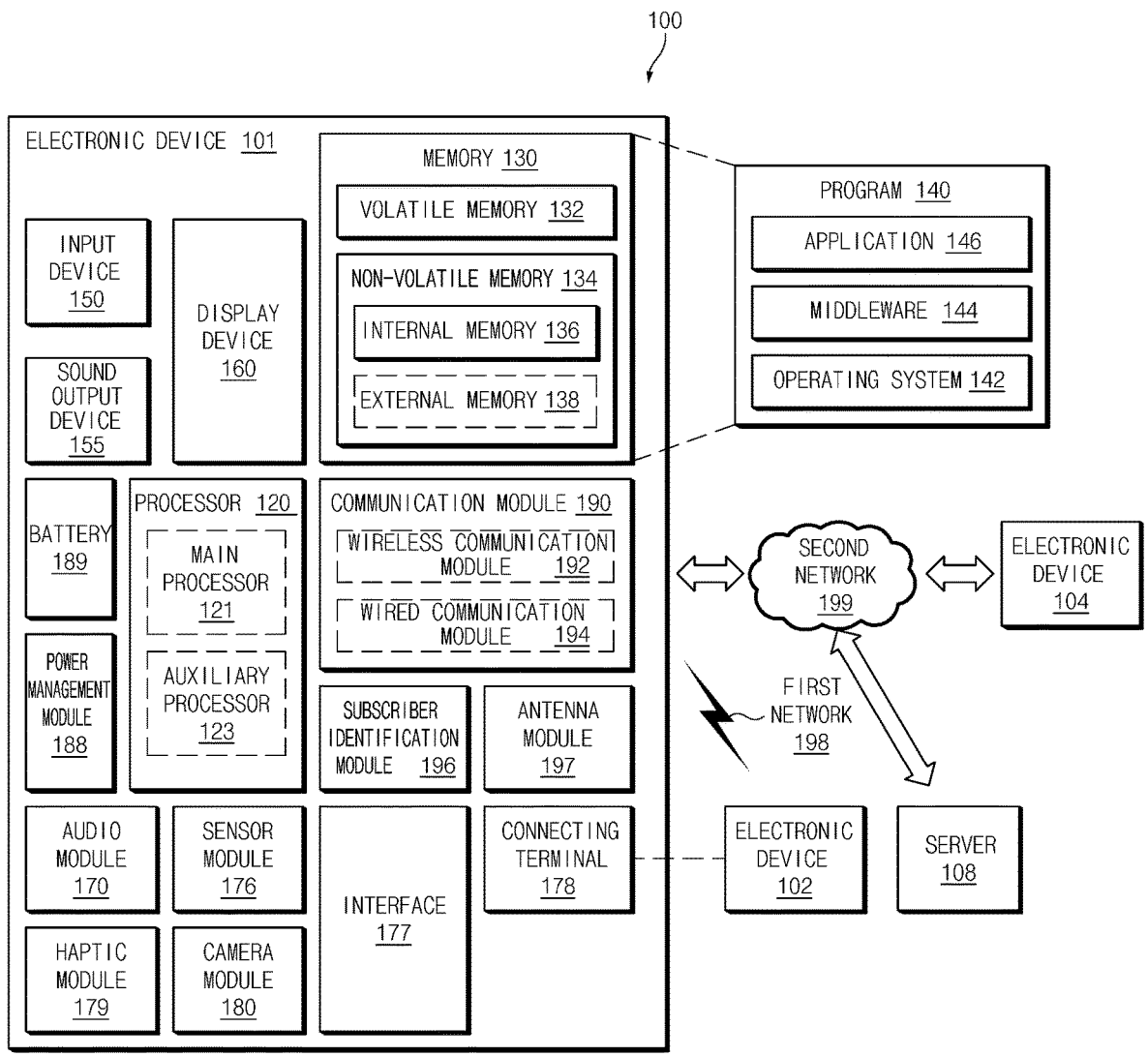
FIG. 1 is a block diagram of an electronic device 101 in a network environment 100, according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an example embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via at least a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
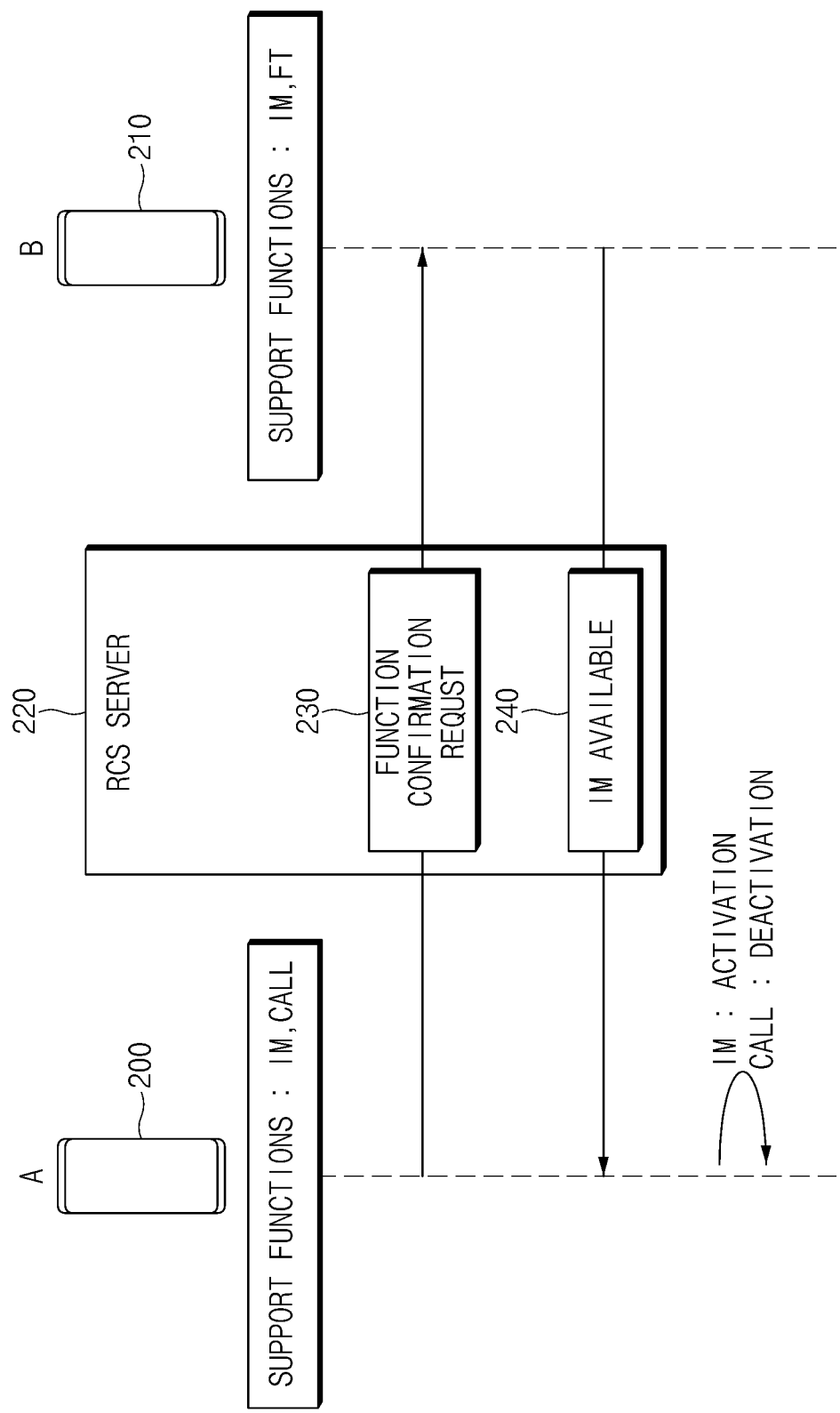
FIG. 2A is a chart illustrating an operation of performing a capability exchange by an example electronic device equipped with one SIM.

FIG. 2A is a chart illustrating an operation of performing a capability exchange by an electronic device equipped with one SIM. FIG. 2B is a diagram illustrating an example of tag information exchanged in an operation of performing a capability exchange of an electronic device.

FIG. 2A illustrates an operation in which an electronic device 200 (e.g., the electronic device 101 of FIG. 1) equipped with one SIM performs a capability exchange before performing RCS communication with an external electronic device. The embodiment according to FIG. 2A may be understood as a description of an operation of performing the capability exchange, according to a comparative example for comparison with an example embodiment.

According to an embodiment, the electronic device 200 may mount one SIM. An RCS function supported by the SIM may be determined when registering the SIM with an RCS server 220 (e.g., the server 108 in FIG. 1). When the electronic device 200 performs RCS communication with an external electronic device 210 (e.g., the electronic device 101 of FIG. 1), at least some of the RCS functions supported by the SIM may be activated or all of the RCS functions may be deactivated. Specifically, among the RCS functions supported by the SIM of the electronic device 200, only the RCS function identical to the RCS function supported by the SIM of the external electronic device 210 may be activated in certain example embodiments. Among the RCS functions supported by the SIM of the electronic device 200, the rest other than the activated ones may be deactivated.

According to an embodiment, in FIG. 2A, a SIM of the electronic device 200 may support an instant message (IM) function and a CALL function, and a SIM of the external electronic device 210 may support an IM function and a file transfer (FT) function. To identify the RCS functions that can be supported by the SIM of the electronic device 200 with respect to the SIM of the external electronic device 210, the electronic device 200 may perform a function confirmation request 230 to the external electronic device 210 through the RCS server 220. For example, the function confirmation request 230 may be understood as transmitting a session initiation protocol (SIP) OPTIONS message. The electronic device 200 may transmit the SIP OPTIONS message to the external electronic device 210 through the RCS server 220, and the external electronic device 210 may transmit a response message 240 through the RCS server 220 to the electronic device 200. In this case, the RCS server 220 may indicate a server of a communication network operator (e.g., KT or SKT), and may be assumed to provide a communication function and an RCS service of each electronic device.

The electronic device 200 may identify a result of performing the capability exchange by identifying a type of the response message 240 received from the external electronic device 210 through the RCS server 220, and may notify the user of the result of performing the capability exchange. For example, although there are several types of the response message 240 illustrated in FIG. 2A, representatively, a response message of 200 OK and a response message of 404 NOT FOUND may be included. The response message of 404 NOT FOUND may be a message notifying that the electronic device 200 and the external electronic device 210 cannot use the RCS service. A similar response message may include a response message of 480 TEMPORARILY UNAVAILABLE or 408 REQUEST TIMEOUT. On the other hand, the response message of 200 OK may be a message notifying that the electronic device 200 and the external electronic device 210 can use the RCS service. In the response message of 200 OK, tag information indicating the type of available RCS service may be inserted together. In the response message of 200 OK, tag information as in the example illustrated in FIG. 2B is inserted, and the electronic device 200 may identify the type of available RCS service with the external electronic device 210 through the tag information. For example, referring to FIG. 2B, when tag information such as 4b is inserted in the response message of 200 OK, the electronic device 200 may use an RCS service (e.g., an instant message (IM)) of 4a with the external electronic device 210. In addition, referring to FIG. 2B for example, when tag information such as 5b, 6b, or 7b is inserted in the response message of 200 OK, the electronic device 200 may identify that the RCS service (e.g., file sharing (FT) 5a, and image share 6a, or video share 7a) with the external electronic device 210 is available. In FIG. 2A, the external electronic device 210 may transmit the response message 240 indicating that the IM service is available. The electronic device 200 may activate the IM function and deactivate the CALL function based on the received response message 240.

FIG. 2A illustrates an operation of performing the capability exchange for one external electronic device 210, and in fact, the capability exchange may be performed for a plurality of external electronic devices 210. The electronic device 200 may determine the external electronic device 210 to perform the capability exchange based on contact information registered in the contact list. The contact list may be information stored in a SIM of the electronic device 200, a memory (e.g., the memory 130 of FIG. 1), and/or an application. The electronic device 200 may perform the capability exchange with respect to all external electronic devices 210 stored in the contact list.

Figure 3:
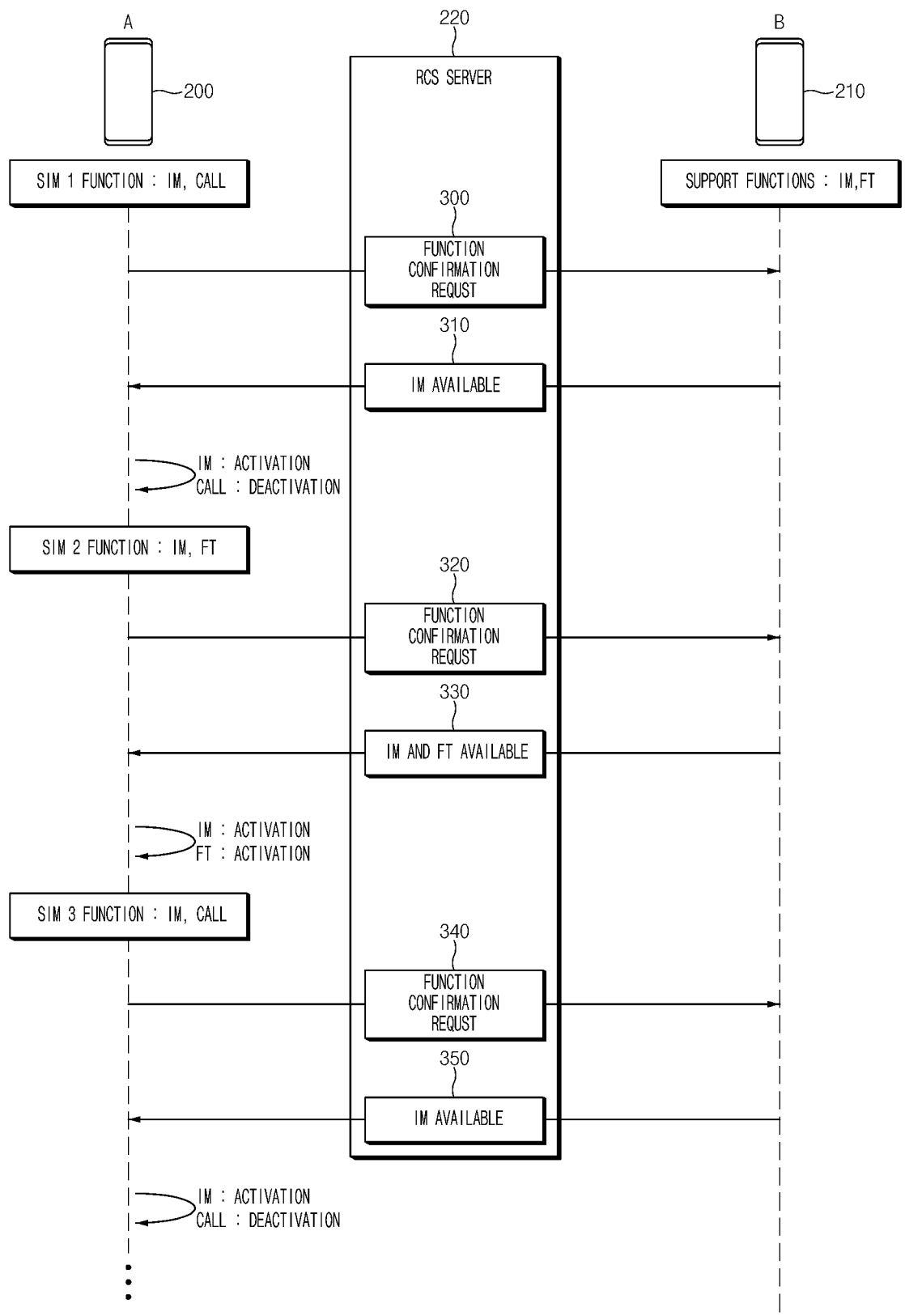
FIG. 3 is a chart illustrating an operation of performing a capability exchange by an electronic device equipped with a multi-SIM, according to a comparative example for comparison with an example embodiment.

FIG. 3 is a chart illustrating an operation of performing a capability exchange by an electronic device equipped with a multi-SIM, according to a comparative example for comparison with an example embodiment.

FIG. 3 illustrates an operation of performing a capability exchange by the electronic device 200 (e.g., the electronic device 101 of FIG. 1) equipped with a multi-SIM before performing the RCS communication with an external electronic device. The embodiment according to FIG. 3 may be understood as performing the capability exchange by the electronic device 200 equipped with a multi-SIM, according to a comparative example for comparison with an example embodiment.

According to an embodiment, a multi-SIM may be mounted on the electronic device 200. The multi-SIM may include two or more SIMs, and each of the SIMs may support different RCS functions. For example, the electronic device 200 may include a first SIM and a second SIM. Each of the first SIM and the second SIM may correspond to the subscriber identification module 196 of FIG. 1. The first SIM and the second SIM may provide information related to user authentication or a security function. The first SIM is a separate module distinguished from the electronic device 200, and may be used by being mounted on the electronic device 200. The electronic device 200 may perform communication depending on subscriber information of the first SIM. The second SIM may be an embedded SIM embedded in the electronic device 200. The electronic device 200 may download a profile and may install the profile to the second SIM. The profile may be referred to as, for example, an application, a file system, or an authentication key value, which are packaged in software form. The electronic device 200 may perform communication depending on subscriber information of the second SIM. The description of the first SIM and the second SIM is described as an example, and embodiments of the disclosure are not limited thereto. Each "module" herein may comprise circuitry.

According to various example embodiments, the electronic device 200 having a multi-SIM may be set to communicate (e.g., transmit/receive) using one of a plurality of SIMs mounted in the electronic device 200 at one point in time. For example, the electronic device 200 may operate in a dual SIM dual standby (DSDS) mode. The electronic device 200 operating in the DSDS mode may include one RF transceiver circuit. For example, a multi-SIM may include a first SIM and a second SIM. In a standby state in which the electronic device 200 does not perform communication, both the first SIM and the second SIM may be maintained in an activated state. When the electronic device 200 performs communication using the first SIM, the first SIM may be maintained in an activated state, but the second SIM may be deactivated. Hereinafter, it is assumed that the electronic device 200 operates in the DSDS mode, but embodiments of the disclosure are not limited thereto. For example, the electronic device 200 may be set to simultaneously perform communication using a plurality of SIMs. For example, in a dual SIM dual active (DSDA) mode, the electronic device 200 may perform communication using the first SIM and may perform communication using the second SIM. Even when the electronic device 200 includes a plurality of RF transceiver circuits associated with a plurality of SIMs (e.g., when the electronic device 200 supports the DSDA mode), the electronic device 200 may be set to perform operations to be described later, due to, for example, restrictions of a mobile network operator (MNO). The number of SIMs in the electronic device 200 according to an example embodiment may be three or more. Even in this case, when the electronic device 200 performs communication with one SIM depending on the number of RF transceiver circuits of the electronic device 200, other SIMs may be maintained in an activated state or a deactivated state.

The example embodiment may also be applied to the electronic device 200 operating in the DSDA mode, but for convenience, it may be assumed that the electronic device 200 described below operates in the DSDS mode. The operation of the electronic device 200 in a multi-SIM environment (e.g., three or more SIMs) in the DSDS mode may be understood that when the electronic device 200 performs communication using one SIM, other SIMs are in an inactive state. According to an embodiment, when performing the RCS communication with the external electronic device 210, the electronic device 200 may use only the RCS functions supported by one SIM in certain example embodiments. Accordingly, when the electronic device 200 performs RCS communication with the external electronic device 210 under the multi-SIM environment, to determine whether which RCS functions can be supported by each SIM, the electronic device 200 may have to perform the capability exchange for all multi-SIMs.

According to an embodiment, in FIG. 3, a first SIM of the electronic device 200 may support an instant message (IM) function and a CALL function, a second SIM of the electronic device 200 may support the IM function and the file transfer (FT) function, a third SIM of the electronic device 200 may support the IM function and the CALL function, and a SIM of the external electronic device 210 may support the IM function and the FT function. To identify the RCS functions that can be supported by the first SIM with respect to the SIM of the external electronic device 210, the electronic device 200 may perform a function confirmation request 300 to the external electronic device 210 through the RCS server 220. The description of the function confirmation request 300 may be referred to by the description of the function confirmation request 230 of FIG. 2A.

The electronic device 200 may identify a result of performing the capability exchange by identifying a type of the response message received from the external electronic device 210 through the RCS server 220, and may notify the user of the result of performing the capability exchange. The external electronic device 210 may transmit a response message 310 indicating that the IM service is available with respect to the first SIM of the electronic device 200. The electronic device 200 may activate the IM function of the first SIM and may deactivate the CALL function of the first SIM, based on the received response message 310. The description of the response message 310 may be referred to by the description of the response message of FIG. 2B.

The electronic device 200 may perform the same capability exchange with the first SIM with respect to the second SIM and the third SIM. The electronic device 200 may perform a function confirmation request 320 to the external electronic device 210 through the RCS server 220 with respect to the second SIM. The electronic device 200 may receive a response message 330 indicating that the IM service and the FT service are available from the external electronic device 210 to activate the IM function and the FT function of the second SIM. The electronic device 200 may perform a function confirmation request 340 to the external electronic device 210 through the RCS server 220 with respect to the third SIM. The electronic device 200 may receive a response message 350 indicating that the IM service is available from the external electronic device 210 to activate the IM function of the third SIM and deactivate the FT function of the third SIM.

FIG. 3 illustrates an operation of performing the capability exchange for one external electronic device 210 in a multi-SIM environment. Actually, the capability exchange may be performed for a plurality of external electronic devices 210. The electronic device 200 may determine the external electronic device 210 to perform the capability exchange based on the contact information registered in the contact list. The contact list may be information stored in a SIM of the electronic device 200, a memory (e.g., the memory 130 of FIG. 1), and/or an application. The electronic device 200 may perform the capability exchange with respect to all external electronic devices 210 determined based on contact information stored in the contact list.

Figure 4:
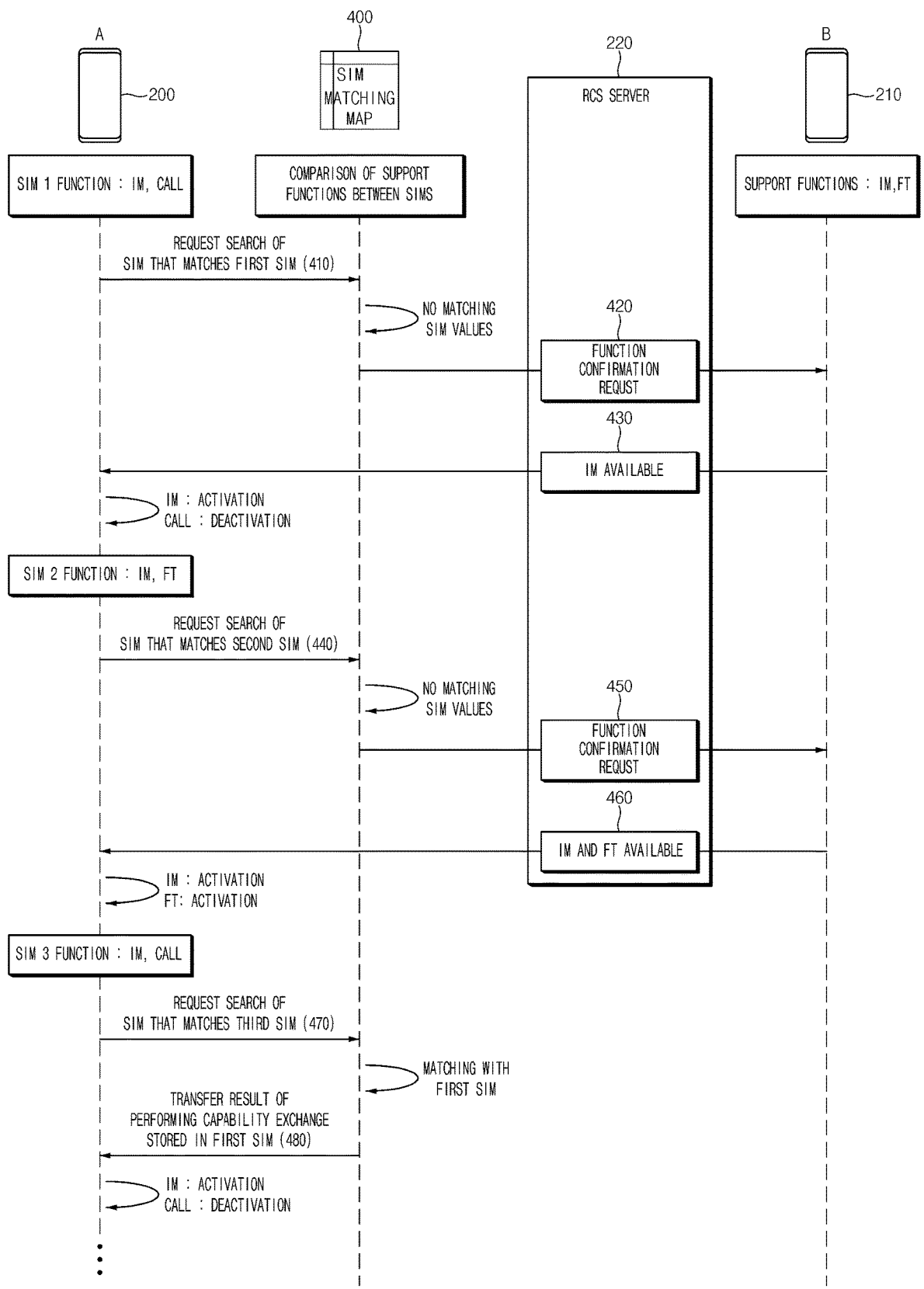
FIG. 4 is a chart illustrating an operation of performing a capability exchange with low-power by an electronic device equipped with a multi-SIM, according to an example embodiment.

FIG. 4 is a chart illustrating an operation of performing a capability exchange with low-power by an electronic device equipped with a multi-SIM, according to an example embodiment.

When the electronic device 200 equipped with a multi-SIM according to a comparative example for comparison with an example embodiment performs the capability exchange, high power consumption and a long execution time may occur. For example, since the electronic device 200 has to perform the capability exchange with respect to all external electronic devices 210 based on the contact list stored in the multi-SIM, the execution time may increase. In addition, since the electronic device 200 needs to identify the RCS functions that can be supported by each SIM, the capability exchange needs to be performed as many as the number of multi-SIM for all external electronic devices. Accordingly, in the multi-SIM environment, it takes longer to perform the capability exchange than when using one SIM, and thus more power consumption may be required.

Figure 5:
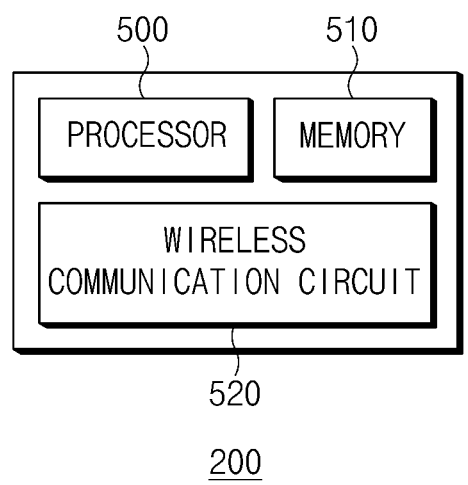
FIG. 5 is a block diagram illustrating configurations of an example electronic device.

Referring to FIG. 5, FIG. 5 is a block diagram illustrating components of an electronic device 200.

According to an embodiment, the electronic device 200 may include a processor 500, a memory 510, and/or a wireless communication circuit 520. The components of FIG. 5 are an example, and the electronic device 200 may further include other components.

The processor 500 (e.g., the processor 120 of FIG. 1) executes, for example, software (e.g., the program 140 of FIG. 1) to control at least one other components (e.g., hardware or software components) of the electronic device 200 connected, directly or indirectly, to the processor 500, and to perform various data processing or operations. The processor 500 may be electrically connected, directly or indirectly, to other components (e.g., the memory 510 and the wireless communication circuit 520) of the electronic device 200.

The memory 510 (e.g., the memory 130 of FIG. 1) may store various data used by at least one component (e.g., the processor 500) of the electronic device 200. The data may include, for example, software (e.g., the program 140 of FIG. 1) and input data or output data associated with a command of the software. The memory 510 may include a volatile memory (e.g., 132 of FIG. 1) or a non-volatile memory (e.g., 134 of FIG. 1). When the electronic device 200 includes an embedded SIM, the memory 510 may store data associated with a profile of the embedded SIM.

The wireless communication circuit 520 (e.g., the communication module 190 of FIG. 1, comprising communication circuitry) may establish a direct (e.g., wired) communication channel or a wireless communication channel between the electronic device 200 and the external electronic device 210, and may support a communication operation through the established communication channel. The processor 500 may communicate with the external electronic device 210 and/or the RCS server 220 using the wireless communication circuit 520. For example, the processor 500 may perform RCS communication and/or the capability exchange with the external electronic device 210. Each processor herein comprises processing circuitry.

Referring back to FIG. 4, the electronic device 200 may generate a matching map 400 comparing RCS functions supported by each SIM. For example, the electronic device 200 may generate the matching map 400 based on a result (e.g., a response message obtained from the at least one external electronic device 210) of an operation of performing the capability exchange for the at least one external electronic device 210. The matching map 400 may be stored in the memory 510 of the electronic device 200.

The electronic device 200 may simplify an operation of the capability exchange by using the matching map 400. FIG. 6 may be referred to for a detailed description of the matching map.

Referring to FIG. 6, FIG. 6 illustrates a method of setting a matching map for a capability exchange of an electronic device, according to an example embodiment.

The matching map of FIG. 6 (e.g., 400 of FIG. 4) is generated in a table format, but this is an example. The matching map 400 may be generated in any form capable of comparing the RCS functions of the multi-SIM mounted in the electronic device 200. For example, the matching map 400 may be generated in the form of a query or list. The matching map 400 may be stored in a memory of the multi-SIM and/or in a memory (e.g., the memory 510 of FIG. 5) of the electronic device 200, and may be processed by the processor (e.g., the processor 500 of FIG. 5) of the electronic device 200.

The matching map 400 may be set in various ways according to a registration status of each SIM in the RCS server 220 and the RCS function matching between the SIMs. A matching map 600 illustrates a setting status of the matching map 400 when the multi-SIM has not yet been registered in the RCS server 220. A matching map 610 illustrates a setting status of the matching map 400 when all of multi-SIMs are registered in the RCS server 220. A matching map 620 illustrates a setting status of the matching map 400 when the registration of any one of the multi-SIMs is released in the RCS server 220.

According to example embodiment, the matching map 600 represents an initial setting of the matching map. The electronic device 200 cannot know the RCS function supported by the multi-SIM until the multi-SIM is registered in the server. Therefore, a field related to SIMs whose RCS function is unknown may be set to '−1' on the matching map 600. For example, in the initial state (e.g., when a user boots up the electronic device 200), all fields of the matching map 600 may be set to '−1' except for fields in which the same SIM is compared.

According to an embodiment, the matching map 610 compares RCS functions supported by each SIM when a multi-SIM is registered in the RCS server 220 and an RCS function supported by each SIM is determined. Each field of the matching map 610 may be set to '1' when the functions of the two SIMs are the same and may be set to '0' when the functions of the two SIMs are not the same, by comparing the RCS functions of the two SIMs corresponding to a row and a column of the field. In this case, the case in which the functions of the two SIMs are the same may indicate, for example, a case in which all functions supported by the first SIM are supported by the second SIM. When the second SIM supports only some of the functions supported by the first SIM or supports other functions, the two SIMs cannot be considered to be the same. In the matching map 610, a field with the same SIM corresponding to a row and a column has no meaning of comparison, and may be set to a NULL value. For example, when the RCS functions of the first SIM and the second SIM do not match as in the matching map 610, the field corresponding to the first SIM and the second SIM may be set to '0'. As in the above description, when the RCS functions of the second SIM and the third SIM do not match, the field corresponding to the second SIM and the third SIM may be set to '0'. As another example, when the RCS functions of the first SIM and the third SIM are the same, the field corresponding to the first SIM and the third SIM may be set to '1'. The fields corresponding to the first SIM and the first SIM, the second SIM and the second SIM, and the third SIM and the third SIM may be set to NULL values as in the matching map 610.

According to an embodiment, the matching map 620 indicates a setting status of the matching map 620 when any one of the multi-SIMs is released from the RCS server. Since the electronic device 200 cannot know that which RCS functions are supported for the deregistered SIM, a field related to the deregistered SIM in the matching map 620 may be set to '−1'. For example, when the registration of the third SIM is released, all fields related to the third SIM may be set to '−1'. Accordingly, as in the matching map 620, the fields corresponding to the first SIM and the third SIM, and the second SIM and the third SIM may be set to '−1'.

In FIG. 6, the types of the matching map and the display method for each field in the matching map are an example, and the example embodiment is not limited thereto.

Referring back to FIG. 4, the electronic device 200 may perform the capability exchange using the matching map 400. The matching map 400 may be initially set like the matching map 600 of FIG. 6, and may be set like the matching map 610 of FIG. 6 when the multi-SIM is registered in the RCS server 220. In an embodiment, it may be understood that the capability exchange for the multi-SIM of FIG. 4 is sequentially performed in the order of the first SIM to the third SIM, but this is illustrative and the example embodiment is not limited thereto. For example, the capability exchange for a multi-SIM may be performed according to a designated priority between each SIMs, or may be performed according to an arbitrary order. For convenience of description, it is assumed below that the capability exchange is sequentially performed in the order of the first SIM to the third SIM. The capability exchange using the matching map 400 of FIG. 4 may be performed by the processor 500 of the electronic device 200.

According to an embodiment, the processor 500 may perform the capability exchange using a matching map (e.g., the matching map 610 of FIG. 6) after the multi-SIM is registered in the RCS server 220. The processor 500 may search for a SIM that matches the first SIM using the matching map 400 (410). For example, the matching map 400 may be stored in a memory of the multi-SIM and/or in the memory 510 of the electronic device 200, and may be processed by the processor 500 of the electronic device 200.

The processor 500 may identify that the RCS functions supported by the first SIM and the third SIM match each other. The processor 500 may determine whether a result of performing the capability exchange is stored in the third SIM supporting the same RCS functions. However, since the capability exchange for the third SIM has not been performed yet, the processor 500 cannot identify the result of performing the capability exchange for the third SIM. In this case, to identify the RCS functions that can be supported by the first SIM with respect to the SIM of the external electronic device 210, the processor 500 may perform a function confirmation request 420 to the external electronic device 210 through the RCS server 220. The external electronic device 210 may transmit a response message 430 indicating that the IM service is available with respect to the first SIM of the electronic device 200. The processor 500 may activate the IM function of the first SIM and may deactivate the CALL function of the first SIM, based on the received response message 430. The result of performing the capability exchange for the first SIM may be stored in the first SIM. For example, as a result of performing the capability exchange with the external electronic device 210 by the first SIM of the electronic device 200, information indicating that the IM function of the first SIM is activated and the CALL function of the first SIM is deactivated may be stored. The result of performing the capability exchange may be stored in the electronic device 200 and/or 210 and/or the matching map 400.

The processor 500 may search for a SIM that matches the second SIM using the matching map 400 (440). When there are no SIMS that matches the second SIM, to identify the RCS functions that can be supported by the second SIM with respect to the SIM of the external electronic device 210, the processor 500 may perform a function confirmation request 450 to the external electronic device 210 through the RCS server 220. The external electronic device 210 may transmit a response message 460 indicating that the IM service and FT service are available with respect to the second SIM of the electronic device 200. The processor 500 may activate the IM function and the FT function of the second SIM, based on the received response message 460. The result of performing the capability exchange for the second SIM may be stored in the second SIM. For example, as a result of performing the capability exchange with the external electronic device 210 by the second SIM of the electronic device 200, information indicating that the IM function and the FT function of the second SIM are activated may be stored.

The processor 500 may search for a SIM that matches the third SIM using the matching map 400 (470). For example, since the third SIM has the same supported functions as the first SIM, the field comparing the functions of the first SIM and the third SIM on the matching map 400 (e.g., the matching map 610 in FIG. 6) may be set to '1'. The processor 500 may identify that the first SIM and the third SIM match in the matching map 400, and may activate at least one of the RCS functions supported by the third SIM or deactivate all of the RCS functions supported by the third SIM using the result of performing the capability exchange stored in the first SIM without performing the function confirmation request with respect to the SIM of the external electronic device 210 (480). For example, when the electronic device 200 performs RCS communication with the external electronic device 210 based on a result of performing the capability exchange with respect to the first SIM, the IM function of the third SIM may be activated and the CALL function may be deactivated.

When the RCS functions supported by the multi-SIM match, since the processor 500 may omit the function confirmation request with respect to the external electronic device 210 as in the embodiment of FIG. 4, time and power consumption required for the capability exchange may greatly decrease.

Figure 7:
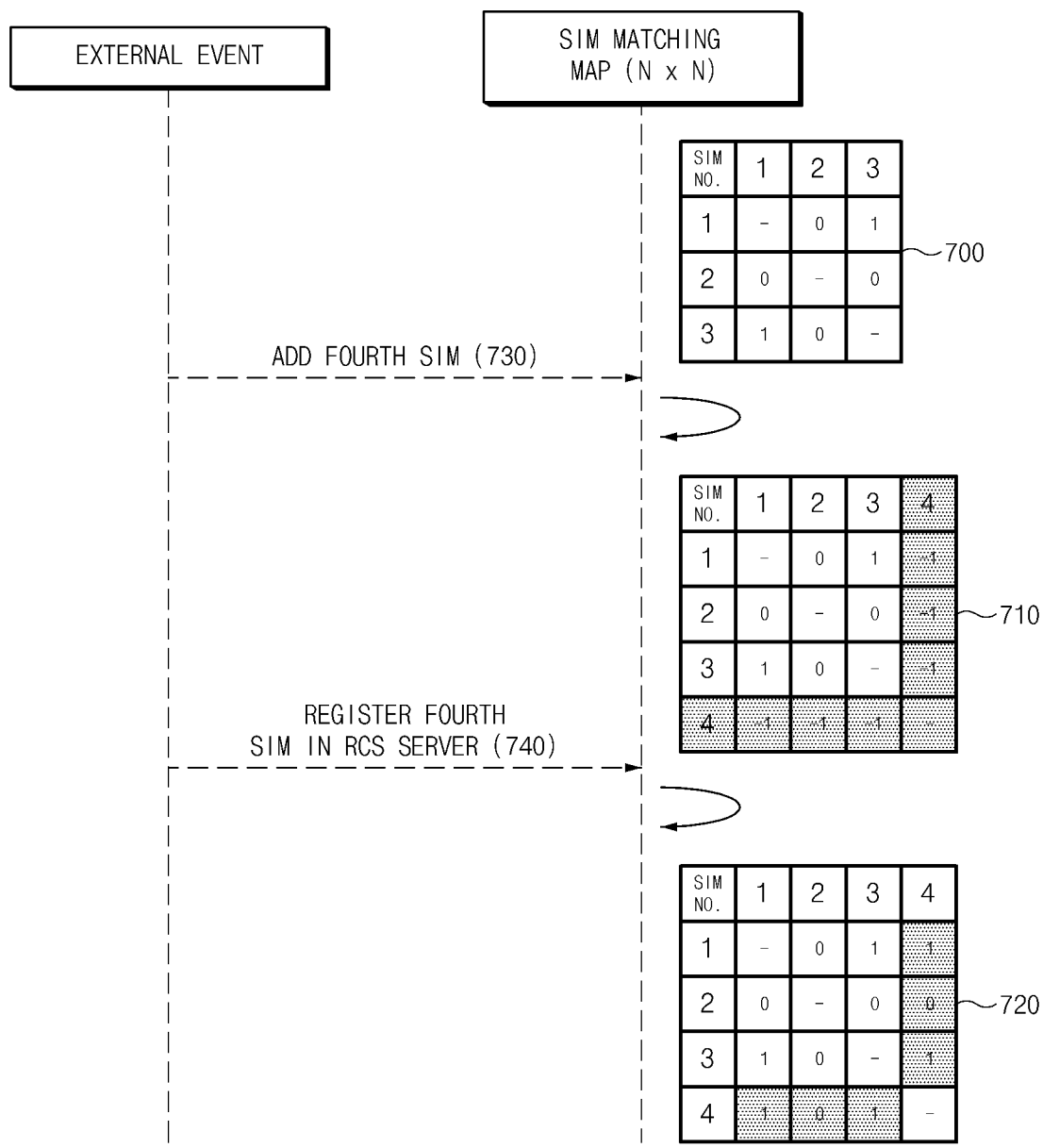
FIG. 7 illustrates an operation of updating a matching map when a SIM is added to the electronic device equipped with a multi-SIM, according to an example embodiment.

FIG. 7 illustrates an operation of updating a matching map when a SIM is added to the electronic device 200 equipped with a multi-SIM, according to an example embodiment. Each embodiment herein may be used in combination with any other embodiment described herein.

According to an embodiment, a new SIM may be added to the electronic device 200 on which a multi-SIM (e.g., a first SIM, a second SIM, and a third SIM) is mounted. When the new SIM is added, the electronic device 200 capable of performing RCS communication should perform a capability exchange with respect to the added SIM. To perform the low-power capability exchange of FIG. 4, the electronic device 200 may update a matching map (e.g., 400 of FIG. 4) with respect to the newly added SIM. The matching map 400 before the new SIM is added may be set to a matching map 700. When a new SIM (e.g., a fourth SIM) is added (730), the processor (e.g., the processor 120 of FIG. 1) may expand the existing matching map 700 like a matching map 710 so as to include comparison information for all SIMs in the matching map 400. Since the processor 120 cannot know the RCS function supported by the new SIM, a field related to the newly added fourth SIM may be set to '−1'. The processor 120 may register the fourth SIM in the RCS server 220 (740), and may identify the RCS functions supported by the fourth SIM. The processor 120 may update the matching map 710 like a matching map 720 by comparing the RCS function supported by the fourth SIM with that of other SIMs. For example, as illustrated in the matching map 720, the fourth SIM may have the same RCS functions as the first SIM and the third SIM, and may not match the RCS functions of the second SIM. In this case, referring to the matching map 720, the fields for the first SIM and the fourth SIM, and the third SIM and the fourth SIM may be set to '1', and the fields for the second SIM and the fourth SIM may be set to '−1'. The fields for the fourth SIM and the fourth SIM may be set to a NULL value. The processor 120 may perform the capability exchange for the fourth SIM using the updated matching map 720. The capability exchange for the fourth SIM of the processor 120 may be referred to by the description of FIG. 4.

Figure 8:
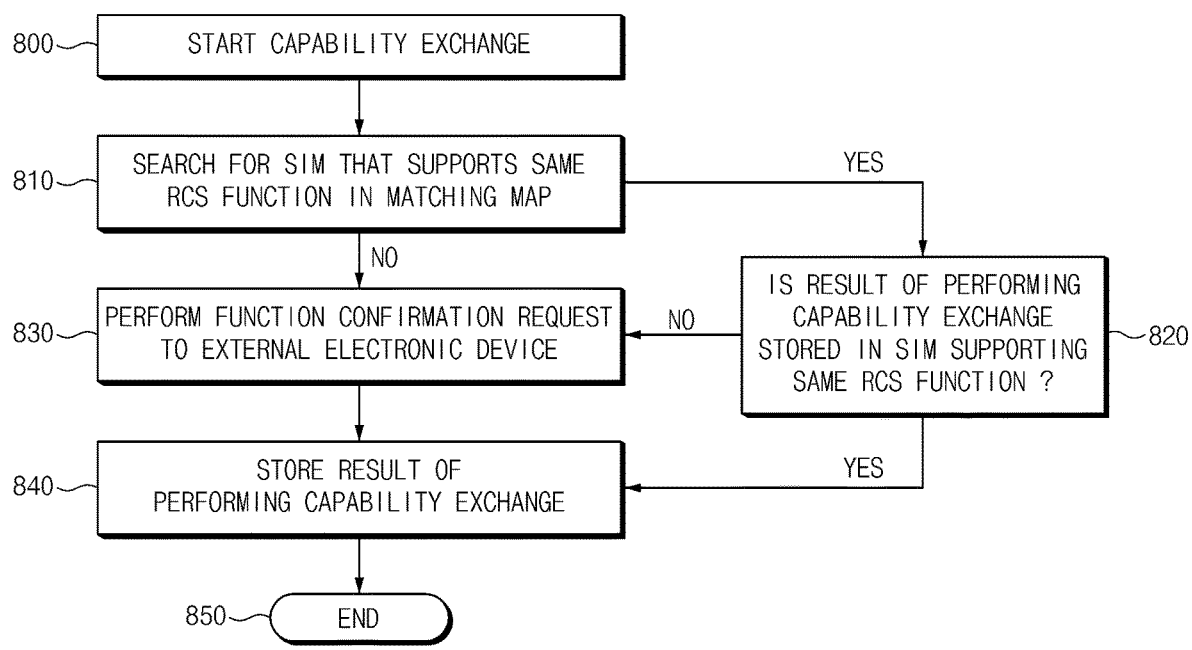
FIG. 8 is a flowchart illustrating an operation in which an electronic device performs a capability exchange using a matching map, according to an example embodiment.

FIG. 8 is a flowchart illustrating an operation in which an electronic device performs a capability exchange using a matching map, according to an example embodiment. The description of FIG. 8 may be referred to by the description of FIGS. 2A to 7.

Referring to operation 800, the processor (e.g., the processor 500 of FIG. 5) of the electronic device (e.g., 200 of FIG. 2A) on which the multi-SIM is mounted may start the capability exchange for one SIM (e.g., a second SIM) to perform RCS communication with the external electronic device (e.g., 210 of FIG. 2A). According to an embodiment, the processor 500 may generate a matching map (e.g., the matching map 400 of FIG. 4) before performing the capability exchange. Since the processor 500 cannot know the function of each SIM before registering the multi-SIM in the RCS server (e.g., 220 in FIG. 2A), the initial matching map 400 may be set like the matching map 600 of FIG. 6. Before performing the capability exchange, the processor 500 may register the multi-SIM in the RCS server 220, and the matching map 400 may be set like the matching map 610 of FIG. 6.

The capability exchange may be initiated in various situations. For example, when the electronic device 200 is booted, the capability exchange for all external electronic devices 210 registered in the contact list may be started. As another example, when a contact for a new external electronic device 210 is added to the contact list, the capability exchange may be started. As another example, when a new SIM is added, the capability exchange may be started with respect to the added SIM. For another example, when the capability exchange has already been performed with respect to the external electronic device 210, but the validity period set by the external electronic device 210 and/or the RCS server 220 expires, the capability exchange may be started again.

In operation 810, the processor 500 may search for whether there is a SIM (e.g., the first SIM) supporting the same RCS function as one SIM (e.g., the second SIM) using the matching map 400. For example, when the matching map 400 is set like the matching map 610 of FIG. 6, it may be searched for whether there is a field set to '1' among fields comparing one SIM (e.g., the second SIM) with another SIM.

When there is no SIM (e.g., the first SIM) supporting the same RCS function (operation 810—NO), operation 830 may be performed. In operation 830, the processor 500 may perform the function confirmation request to the external electronic device 210 through the RCS server 220. The processor 500 may receive the response message from the external electronic device 210 to activate at least one of the RCS functions of one SIM (e.g., the second SIM) or deactivate all of them. When the capability exchange is completed, operation 840 may be performed. A description of the function confirmation request and the response message may be referred to by the description of FIG. 4.

When there is a SIM (e.g., the first SIM) supporting the same RCS function (operation 810—YES), operation 820 may be performed. In operation 820, the processor 500 may determine whether a result of performing the capability exchange is stored in the SIM (e.g., the first SIM) supporting the same RCS function. When the result of performing the capability exchange is not stored in the SIM (e.g., the first SIM) supporting the same RCS function (operation 820—NO), operation 830 may be performed. When the result of performing the capability exchange is stored in the SIM (e.g., the first SIM) supporting the same RCS function (operation 820—YES), the processor 500 may complete the capability exchange with respect to one SIM (e.g., second SIM) by using the result of performing the capability exchange stored in the SIM (e.g., the first SIM) supporting the same RCS function without performing the function confirmation request to the external electronic device 210. For example, when the electronic device 200 performs RCS communication with the external electronic device 210 based on the result of performing the capability exchange with respect to the SIM (e.g., the first SIM) supporting the same RCS function, the processor 500 may activate at least some of the RCS functions supported by one SIM (e.g., the second SIM) or may deactivate all of the RCS functions supported by one SIM (e.g., the second SIM). When the capability exchange for one SIM (e.g., the second SIM) is completed, operation 840 may be performed.

In operation 840, the processor 500 may store the result of performing the capability exchange for one SIM (e.g., the second SIM) in one SIM (e.g., the second SIM).

When the capability exchange for all SIMs is performed with respect to all external electronic devices 210 registered in the contact list of the electronic device 200, the capability exchange may be terminated in operation 850.

Figure 9:
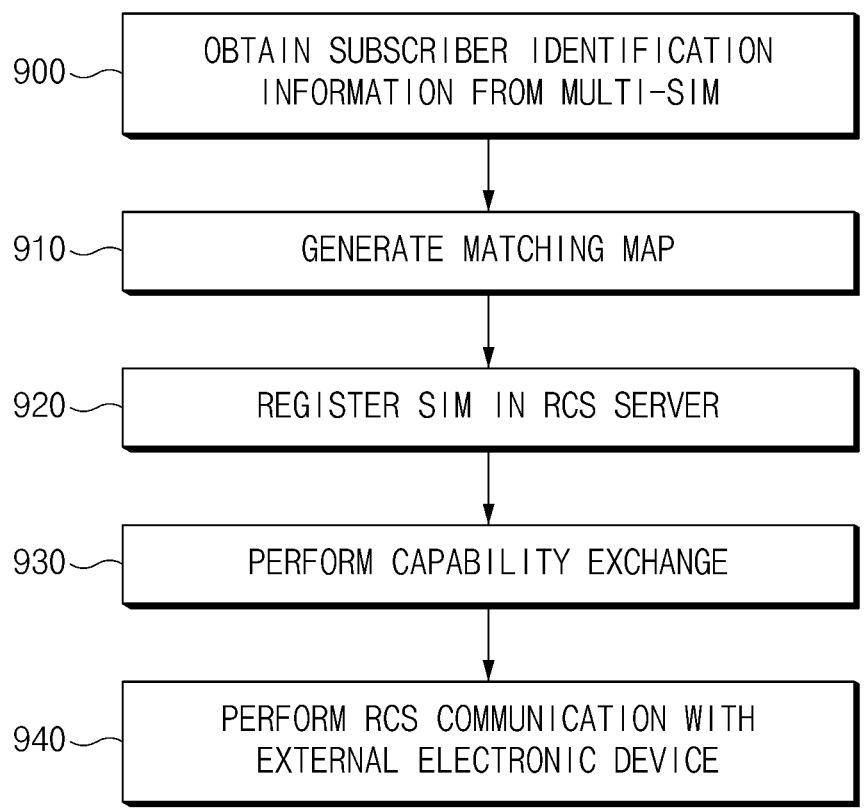
FIG. 9 is a flowchart illustrating an RCS communication of an electronic device, according to an example embodiment.

FIG. 9 is a flowchart illustrating an RCS communication of an electronic device, according to an example embodiment. The description of FIG. 9 may be referred to by the description of FIGS. 2A to 8.

Referring to operation 900, the processor (e.g., the processor 500 of FIG. 5) of the electronic device (e.g., 200 of FIG. 2A) on which the multi-SIM may be mounted, directly or indirectly, may obtain subscriber identification information from the multi-SIM. According to an example embodiment, when at least two SIMs are mounted on the electronic device 200, the processor 500 may obtain first subscriber identification information and second subscriber identification information from the multi-SIM. For example, when the multi-SIM includes a first SIM and a second SIM, the processor 500 may obtain the first subscriber identification information from the first SIM and may obtain the second subscriber identification information from the second SIM. The subscriber identification information may include information about the RCS function supported by a SIM including the subscriber identification information. For example, the first subscriber identification information may include information indicating that the first SIM supports the IM function and the CALL function.

In operation 910, the processor 500 may generate the matching map (e.g., the matching map 400 of FIG. 4). Since the processor 500 cannot, or need not, know the function of each SIM before registering the multi-SIM in the RCS server (e.g., 220 in FIG. 2A), the initial matching map 400 may be set like the matching map 600 of FIG. 6. When each SIM is registered in the RCS server 220, the matching map 400 may include information on whether the RCS functions of each SIM matches.

In operation 930, the processor 500 may perform the capability exchange for the multi-SIM with the external electronic device 210 of the contact list by using the matching map 400. A description of performing the capability exchange of the processor 500 may be referred to by the description of FIG. 8.

In operation 940, the processor 500 may perform RCS communication with the external electronic device 210 based on a result of performing the capability exchange for the multi-SIM. For example, when the electronic device 200 operates in the DSDS mode, the processor 500 may perform RCS communication with the external electronic device 210 using one of the multi-SIMs. In this case, the processor 500 may use at least one of the RCS functions supported by one SIM based on a result of performing the capability exchange with respect to one SIM. "Based on" as used herein covers based at least on.

According to an embodiment, when a SIM is added in the electronic device 200, operation 920 may be performed again, unlike that illustrated in FIG. 9. A description of a case in which the SIM is added in the electronic device 200 may be referred to with reference to the description of FIG. 7.

According to an embodiment, when the registration for at least one of the multi-SIMs of the electronic device 200 is released in the RCS server, the matching map 400 may be updated after operation 920. For example, when registration for the third SIM is released as illustrated in FIG. 6, the matching map 400 may be updated like the matching map 620.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a wireless communication circuit;
a processor operatively connected with the wireless communication circuit;
a multi-SIM; and
a memory operatively connected with the processor, and wherein the memory stores instructions that, when executed, are configured to cause the processor to:
obtain first subscriber identification information and second subscriber identification information from the multi-SIM;
generate a matching map in which RCS functions supported by the first subscriber identification information and the second subscriber identification information are compared;
search for whether the first subscriber identification information matches the second subscriber identification information using at least the matching map;
determined a result of a capability exchange for the first subscriber identification information with an external electronic device via the wireless communication circuit based on the first subscriber identification information not matching the second subscriber identification information;
search for whether the result of the capability exchange for the second subscriber identification information is stored in the second subscriber identification information based on the first subscriber identification information matching the second subscriber identification information; and
determine activation and/or deactivation of the RCS functions supported by the first subscriber identification information based on the result of performing the capability exchange for the second subscriber identification information.

2. The electronic device of claim 1, wherein the instructions are further configured to cause the processor to:
based on the result of the capability exchange for the second subscriber identification information not being stored in the second subscriber identification information, perform the capability exchange for the first subscriber identification information with the external electronic device via the wireless communication circuit.

3. The electronic device of claim 1, wherein the instructions are further configured to cause the processor to:
based on the result of the capability exchange for the second subscriber identification information being stored in the second subscriber identification information, activate and/or deactivate at least one of the RCS functions supported by the first subscriber identification information based on the result of the capability exchange for the second subscriber identification information.

4. The electronic device of claim 1, wherein the instructions are further configured to cause the processor to:
based on the capability exchange for the first subscriber identification information being performed with the external electronic device, control to transmit a function confirmation request to the external electronic device through an RCS server via the wireless communication circuit;
receive a response message through the RCS server from the external electronic device; and activate and/or deactivate at least one of the RCS functions supported by the first subscriber identification information based on the response message.

5. The electronic device of claim 1, wherein the instructions are further configured to cause the processor to:
set the matching map differently based on at least:
when at least one of the first subscriber identification information and the second subscriber identification information is not registered in an RCS server, when both the first subscriber identification information and the second subscriber identification information are registered in the RCS server, and when a registration of at least one of the first subscriber identification information and the second subscriber identification information is released in the RCS server.

6. The electronic device of claim 1, wherein the instructions are further configured to cause the processor to:
when a third subscriber identification information is further obtained, update the matching map; and determine a result of a capability exchange for the third subscriber identification information with the external electronic device based on at least one of:
the matching map, the result of the capability exchange for the first subscriber identification information, and the result of the capability exchange for the second subscriber identification information.

7. The electronic device of claim 1, wherein the multi-SIM includes a first SIM and a second SIM, wherein the first SIM includes the first subscriber identification information, and wherein the second SIM includes the second subscriber identification information.

8. The electronic device of claim 1, wherein the multi-SIM includes an embedded SIM, and wherein the instructions are further configured to cause the processor to: download and install a profile for at least one of the first subscriber identification information and the second subscriber identification information to the embedded SIM.

9. A method of operating an electronic device, the method comprising:
obtaining first subscriber identification information and second subscriber identification information from a multi-SIM;
generating a matching map in which RCS functions supported by the first subscriber identification information and the second subscriber identification information are compared; searching for whether the first subscriber identification information matches the second subscriber identification information using the matching map;
performing a capability exchange for the first subscriber identification information with an external electronic device when the first subscriber identification information does not match the second subscriber identification information;
searching for whether a result of performing the capability exchange for the second subscriber identification information is stored in the second subscriber identification information when the first subscriber identification information matches the second subscriber identification information; and
determining activation and/or deactivation of the RCS functions supported by the first subscriber identification information based on the result of performing the capability exchange for the second subscriber identification information.

10. The method of claim 9, further comprising:
based on the result of performing the capability exchange for the second subscriber identification information not being stored in the second subscriber identification information, performing the capability exchange for the first subscriber identification information with the external electronic device.

11. The method of claim 9, further comprising:
based on the result of performing the capability exchange for the second subscriber identification information being stored in the second subscriber identification information, activating at least one of the RCS functions supported by the first subscriber identification information and/or deactivating all of the RCS functions supported by the first subscriber identification information, based on the result of performing the capability exchange for the second subscriber identification information.

12. The method of claim 9, further comprising:
based on the capability exchange for the first subscriber identification information being performed with the external electronic device, transmitting a function confirmation request to the external electronic device through an RCS server;
receiving a response message through the RCS server from the external electronic device; and
activating at least one of the RCS functions supported by the first subscriber identification information or deactivating all of the RCS functions supported by the first subscriber identification information, based on the response message.

13. The method of claim 9, further comprising:
setting the matching map differently depending on:
when at least one of the first subscriber identification information and the second subscriber identification information is not registered in an RCS server, when both the first subscriber identification information and the second subscriber identification information are registered in the RCS server, and when a registration of at least one of the first subscriber identification information and the second subscriber identification information is released in the RCS server.

14. The method of claim 9, further comprising:
when a third subscriber identification information is further obtained, updating the matching map; and
performing a capability exchange for the third subscriber identification information with the external electronic device based on at least one of the matching map, the result of performing the capability exchange for the first subscriber identification information, and the result of performing the capability exchange for the second subscriber identification information.

15. The method of claim 9, wherein the multi-SIM includes a first SIM and a second SIM, wherein the first SIM includes the first subscriber identification information, and wherein the second SIM includes the second subscriber identification information.

16. The method of claim 9, wherein the multi-SIM includes an embedded SIM, and wherein the method further comprises downloading and installing a profile for at least one of the first subscriber identification information and the second subscriber identification information to the embedded SIM.

17. A non-transitory computer-readable recording medium storing one or more instructions executable by at least one processor, wherein the one or more instructions are configured to cause the at least one processor to:
obtaining first subscriber identification information and second subscriber identification information from a multi-SIM;
generating a matching map in which RCS functions supported by the first subscriber identification information and the second subscriber identification information are compared;
searching for whether the first subscriber identification information matches the second subscriber identification information using the matching map;
performing a capability exchange for the first subscriber identification information with an external electronic device when the first subscriber identification information does not match the second subscriber identification information;
searching for whether a result of performing the capability exchange for the second subscriber identification information is stored in the second subscriber identification information when the first subscriber identification information matches the second subscriber identification information; and
determining activation and/or deactivation of the RCS functions supported by the first subscriber identification information based on the result of performing the capability exchange for the second subscriber identification information.

18. The non-transitory computer-readable recording medium of claim 17, wherein the instructions are further configured to cause the at least one processor to:

based on the result of performing the capability exchange for the second subscriber identification information not being stored in the second subscriber identification information, performing the capability exchange for the first subscriber identification information with the external electronic device.

19. The non-transitory computer-readable recording medium of claim 17, wherein the instructions are further configured to cause the at least one processor to:

based on the result of performing the capability exchange for the second subscriber identification information being stored in the second subscriber identification information, activating at least one of the RCS functions supported by the first subscriber identification information and/or deactivating all of the RCS functions supported by the first subscriber identification information, based on the result of performing the capability exchange for the second subscriber identification information.

20. The non-transitory computer-readable recording medium of claim 17, wherein the instructions are further configured to cause the at least one processor to:

based on the capability exchange for the first subscriber identification information being performed with the external electronic device, transmitting a function confirmation request to the external electronic device through an RCS server;

receiving a response message through the RCS server from the external electronic device; and activating at least one of the RCS functions supported by the first subscriber identification information or deactivating all of the RCS functions supported by the first subscriber identification information, based on the response message.

* * * * *